(12) United States Patent
Orfield

(10) Patent No.: US 7,840,310 B2
(45) Date of Patent: Nov. 23, 2010

(54) ARCHITECTURAL DYNAMIC CONTROL: INTELLIGENT ENVIRONMENTAL CONTROL AND FEEDBACK SYSTEM FOR ARCHITECTURAL SETTINGS INCLUDING OFFICES

(75) Inventor: Steven J. Orfield, Minneapolis, MN (US)

(73) Assignee: Orfield Laboratories, Inc., Minnealpolis, MN (US)

( * ) Notice: Subject to any disclaimer, the term of this patent is extended or adjusted under 35 U.S.C. 154(b) by 734 days.

(21) Appl. No.: 11/344,572

(22) Filed: Jan. 30, 2006

(65) Prior Publication Data

US 2006/0184325 A1    Aug. 17, 2006

Related U.S. Application Data

(63) Continuation of application No. 10/456,998, filed on Jun. 6, 2003, now Pat. No. 6,991,029.

(51) Int. Cl.
*G05B 13/02* (2006.01)
*G06F 15/18* (2006.01)
*G06F 11/00* (2006.01)

(52) U.S. Cl. ............................ 700/275; 700/47; 700/49; 700/276; 706/12; 706/14; 706/45; 702/188

(58) Field of Classification Search ................... 700/17, 700/47–49, 83, 91–92, 275–278; 706/11, 706/12, 14–18, 20, 23, 25, 45, 62; 702/131, 702/134, 135, 139, 188; 715/733, 739, 740, 715/750, 961, 965; 315/312, 317–319, 361
See application file for complete search history.

(56) References Cited

U.S. PATENT DOCUMENTS

| | | | |
|---|---|---|---|
| 3,744,555 A | 7/1973 | Fletcher et al. | |
| 4,071,745 A | 1/1978 | Hall | |
| 4,074,124 A | 2/1978 | Maute et al. | |
| 4,244,517 A | 1/1981 | Stanke et al. | |
| 4,495,560 A | 1/1985 | Sugimoto et al. | |
| 4,571,950 A | 2/1986 | Nariai et al. | |
| 5,190,096 A | 3/1993 | Taniguchi et al. | |
| 5,215,468 A | 6/1993 | Lauffer et al. | |
| 5,259,553 A | 11/1993 | Shyu | |
| 5,285,356 A | 2/1994 | Skene et al. | |
| 5,304,112 A | 4/1994 | Mrklas et al. | |
| 5,505,378 A | 4/1996 | Park | |
| 5,566,237 A | 10/1996 | Dobbs et al. | |
| 5,589,741 A | 12/1996 | Terman et al. | |
| 5,762,265 A * | 6/1998 | Kitamura et al. | ............... 236/51 |
| 5,793,874 A | 8/1998 | Camire | |
| 5,838,226 A * | 11/1998 | Houggy et al. | ......... 340/310.11 |
| 5,930,501 A | 7/1999 | Neil | |
| 5,945,993 A * | 8/1999 | Fleischmann | ............... 715/771 |
| 5,978,737 A * | 11/1999 | Pawlowski et al. | .......... 701/301 |
| 5,990,880 A | 11/1999 | Huffman et al. | |

(Continued)

*Primary Examiner*—Sean P Schechtman
(74) *Attorney, Agent, or Firm*—Merchant & Gould P.C.

(57) ABSTRACT

A smart, adaptive control system that monitors and influences physical conditions of an architectural setting. The architectural setting in which the system is deployed typically includes a plurality of private spaces and at least one community space. The individual private spaces, and the community spaces, may include an environmental control device that affects one or more physical conditions of the individual private space. Each private space may also include an environmental sensor that measures a particular physical condition of the private space. The private spaces may also include one or more occupant sensors, which measure either behavioral or physiological parameters of an occupant. The environmental control devices, environmental sensors, and occupant sensors are in communication with a computer. The computer is also in communication with a database, which houses a data set that describes how to best modify the physical conditions of the architectural setting.

12 Claims, 7 Drawing Sheets

U.S. PATENT DOCUMENTS

| | | | |
|---|---|---|---|
| 6,091,827 A | 7/2000 | Tanaka | |
| 6,339,429 B1 * | 1/2002 | Schug | 345/589 |
| 6,508,831 B1 | 1/2003 | Kushnir | |
| 6,554,439 B1 | 4/2003 | Teicher et al. | |
| 6,675,130 B2 * | 1/2004 | Kanevsky et al. | 702/188 |
| 7,130,719 B2 * | 10/2006 | Ehlers et al. | 700/276 |
| 2003/0216838 A1 * | 11/2003 | Dudley | 700/277 |
| 2006/0173580 A1 * | 8/2006 | Desrochers et al. | 700/276 |

* cited by examiner

ARCHITECTURAL DYNAMIC CONTROL: INTELLIGENT ENVIRONMENTAL CONTROL AND FEEDBACK SYSTEM FOR ARCHITECTURAL SETTINGS INCLUDING OFFICES

This application is a continuation of U.S. application Ser. No. 10/456,998 that was filed with the United States Patent and Trademark Office on Jun. 6, 2003, and that issued as U.S. Pat. No. 6,991,029 on Jan. 31, 2006. The entire disclosure of U.S. application Ser. No. 10/456,998 is incorporated herein by reference.

TECHNICAL FIELD

The present invention relates to an intelligent environmental control and feedback system, and more particularly to an intelligent environmental control and feedback system deployable in an office building setting or other architectural setting.

BACKGROUND OF THE INVENTION

Modern office settings are designed to maximize productivity per unit cost of office space. According to the present mindset, a first hypothetical office setting is thought to be more efficient than a second office setting if the first office is capable of housing assets (human or otherwise) sufficient to yield production equal to that of the second office, but at a lower cost. The unarticulated assumption is that the office setting does not contribute to or affect productivity, rather it merely houses the assets actually responsible for production.

As an outgrowth of the present mindset, only modest attention has been paid to environmental controls for office settings. Temperatures are kept around 72° F. Lights are kept at a level bright enough to enable employees to read. Carpeting may be laid to absorb noise. In short, to the extent environmental variables are controlled at all, they are maintained in a manner intended to be minimally hospitable to employees.

Standing in contradiction to modern office design practice is the knowledge that environmental variables affect behavior. For example, it is known that sunlight affects the mood and activity level of some people. During prolonged periods of low sunlight levels, some people experience symptoms of depression. Given that environmental variables affect human behavior, it would be desirable to have an environmental control system deployable in an office setting for the purpose of producing an environment that stimulates employees of the office.

A desirable environmental control system may have the ability to observe the effects, as exhibited by employees, of various environmental variables as they are manipulated. Additionally, the control system may possess intelligence, in that it will have the capacity to learn how to control the office environment to produce a setting that stimulates employees. Optionally, the control system may possess a database that instructs the system how to control the office setting.

SUMMARY OF THE INVENTION

Against this backdrop, the present invention has been developed. According to one embodiment of the invention, a method for measuring and stimulating feelings or desired behavior within an architectural setting may include the following acts. Behavior of one or more beings within the architectural setting may be sensed, producing sensed behavior data. Physical conditions of the architectural setting may also be sensed, to produce sensed environmental data. Next, the sensed behavior data may be compared to stored desired behavior data, which is associated in a database with environmental control data presumed to influence the desired behavior. The environmental control data may be physically implemented through an environmental control system. Finally, the environmental control data may be automatically altered, when the sensed environmental data equals the environmental control data, and a difference between sensed behavior data and desired behavior data exists.

According to another embodiment of the invention, a method for encouraging desired behavior within an architectural setting may include controlling environmental variables within the architectural setting to change throughout a period of time in accordance with a selected theme.

According to another embodiment of the present invention, a method for encouraging desired behavior within an office setting may include the following acts. A plurality of physical conditions may be initially controlled within the office setting, so as to hold the physical conditions substantially constant. One of the physical conditions may be altered. Next, a change in behavior of an occupant of the office setting may be observed. A relationship between the change of behavior and the altered physical condition may be determined. Finally, the relationship may be stored in a database.

According to another embodiment of the invention, a method for encouraging desired behavior within an office setting may include the following acts. A plurality of physical conditions within the office setting may be initially controlled, so as to cause the physical conditions to vary in accordance with a theme. One of the physical conditions may be altered, so as to cause the altered physical condition to deviate from the theme. Then, a change in behavior of an occupant of the office setting may be observed. Thus, a relationship between the change of behavior and the altered physical condition may be determined. Finally, the relationship may be stored in a database.

According to another embodiment of the invention, a system for encouraging desired behavior within an office setting having a plurality of private spaces and at least one community space may include the following. The system may include at least one environmental control device in each of the private spaces and in the community space. The environmental control device may affect at least one physical condition of the space in which it resides. Further, the system may include at least one environmental sensor in each of the private spaces and in the community space. The environmental sensor may measure at least one physical condition of the space in which it resides. Still further, the system may include at least one occupant sensor in each of the private spaces and in the community space. The occupant sensor may measure either a physiological parameter or behavior parameter of an occupant in the space in which the occupant sensor resides. The environmental control devices, environmental sensors, and occupant sensors may be in communication with a computer. The computer may be programmed to carry out the following steps. The computer may receive data from the occupant sensors and environmental sensors. The computer may compare the data from the occupant sensors to desired values stored in a database. If the data from the occupant sensors differs from the desired value from the database, the computer may command the environmental control devices in either the private spaces or community space to change a physical condition, so as to bring the physiological or behavioral parameter toward the desired value.

According to another embodiment of the invention, a system for encouraging desired behavior within an architectural setting may include at least one environmental control device in the architectural setting. The environmental control device may affect at least one physical condition of the architectural setting in which it resides. The environmental control device may be in communication with a computer, which may be programmed to carry out the following steps. The computer may access a memory device that stores survey data, and may control the environmental control device, based upon the survey data.

According to another embodiment of the invention, a method of controlling physical conditions of an architectural setting may include conducting an occupant survey, thereby generating data regarding subjective occupant reaction to a physical condition of the architectural setting. Thereafter, the survey data may be stored in a memory device in communication with a computer. The computer may control physical conditions of the architectural setting, based upon the survey data stored in the memory device.

According to another embodiment of the invention, a method of measuring physical conditions throughout an architectural setting may include providing an environmental measuring device to an organization. Thereafter, the organization may be instructed to locate the environmental measuring device at a plurality of locations within the architectural setting. Further, the organization may be instructed to use the environmental measuring device to take at least one measurement for each of the plurality of locations within the architectural setting. Finally, measurements from the environmental measuring device may be received.

DETAILED DESCRIPTION

Figure 1:
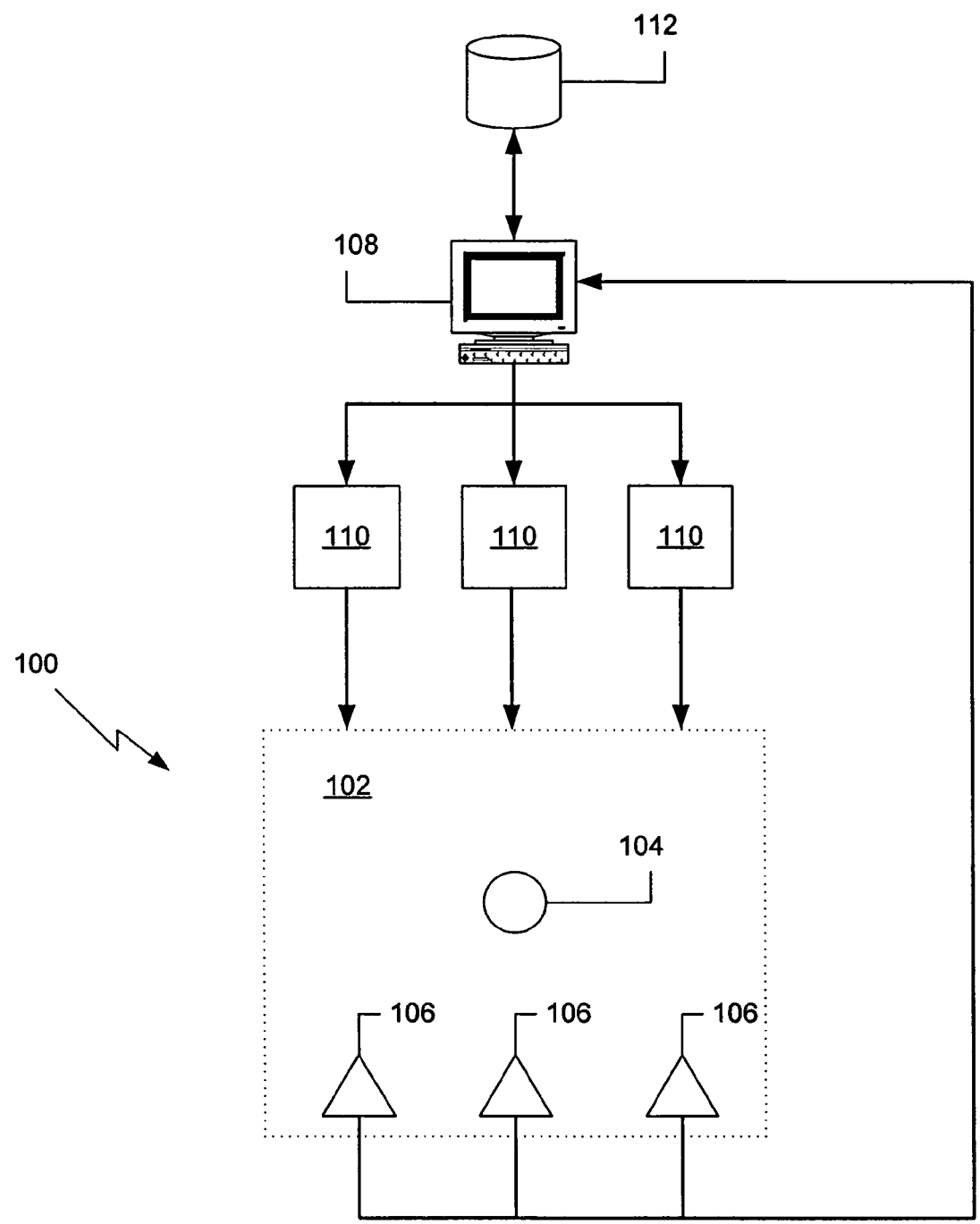
FIG. 1 depicts an architectural setting in which a system in accordance with the present invention has been deployed.

Encouragement of workplace efficiency can be achieved by implementation of a smart, adaptive control system that monitors and influences physical conditions of the workplace. The workplace in which the system is deployed typically includes a plurality of private spaces and at least one community space. Oftentimes, the individual private spaces include an environmental control device that affects one or more physical conditions of the individual private space. For example, a heating/cooling unit is an example of an environmental control device that affects the temperature (a physical condition) of the private space. Each individual private space may also include an environmental sensor that measures a particular physical condition of the private space. A thermometer is a simple example of an environmental sensor that measures the temperature of a private space. Further, the private spaces may also include one or more occupant sensors. Occupant sensors measure either behavioral or physiological parameters of an occupant. For example, an occupant sensor may measure the blood pressure, heart rate, respiration rate, or body temperature (physiological parameters) of an occupant. Additionally, an occupant sensor may detect the presence or absence of an occupant or may detect the number of times a workplace occupant passes a certain point (examples of behavioral parameters). The community space may also be equipped with one or more environmental control devices, environmental sensors, and/or occupant sensors.

The environmental control devices, environmental sensors, and occupant sensors are in communication with a computer that is capable of reading data from the sensors and commanding the control devices. The computer is also in communication with a database, which houses a data set constructed by the system over time. The data set housed in the database describes how to best modify the physical conditions of the work place to bring about maximum occupant activity and comfort.

Optionally, the system may have various modes of operation. For example, in one mode of operation, the system controls the physical conditions of the workplace in accordance with a theme. One example of a theme is mimicry of the daily patterns of daylight—lights begin the day brighter on the east side of the office and progressively become brighter on the west side of the office as the day wears on. The temperature, humidity, and other physical conditions may also mimic the typical pattern of a day (cool in the morning warmer in the afternoon, and cool again towards evening). Another theme is controlling variables to oscillate around nominally comfortable values. For example, temperature may be made to oscillate around 72° F. The oscillation may occur at any frequency. For example, temperature (or any other variable) may be made to rise and fall at least twice per day. Another example of a theme involves mimicry of the pattern of current outdoor conditions. Other themes also exist. Optionally, during execution of a theme, the system may monitor the various occupants of the work place, and vary one or more physical conditions so as to maximize that occupant's productivity. Thus, one or more physical conditions may deviate from the overall theme, if the system determines that the occupant needs to be stimulated in some way.

An alternative mode of operation involves monitoring the preferences of one or more occupants, as they control physical conditions for themselves. For example, the system may observe how occupants set various environmental control devices throughout the day (how an occupant sets a thermostat, a fan, a privacy level, etc.). Based upon these observations, the system may automatically control the physical conditions of each private space in accord with the recorded preferences of the occupant. Optionally, in this mode of operation, the system monitors the various occupants of the work place, and varies one or more physical conditions so as to maximize that occupant's productivity. Thus, in a given private space, one or more physical conditions may deviate from the observed preference of the occupant, if the system determines that the occupant needs to be stimulated in some way.

Yet another mode of operation involves maintaining the physical conditions in a relatively static fashion, with each parameter chosen so as to be normatively comfortable (temperature is 72° F., humidity 50%, etc.). Throughout the day, the various occupants are monitored, and one or more physical conditions are varied, so as to provide the desired occupant response.

In the following disclosure, the discussion related to FIGS. 1-4 relates primarily to workplace structures and corresponding system structures. The remainder relates primarily to operation of the control system.

FIG. 1 depicts a workplace 100 in which one system in accordance with the present invention has been deployed. As can be seen from FIG. 1, the workplace 100 contains one space 102. The space 102 is either a private space or a community space. An example of a private space is an individual office or a cubicle, and an example of a community space is a hallway, auditorium, or cafeteria. The space 102 is shown as containing one occupant 104, although it may contain more occupants. The space 102 is shown as containing three sensors 106, each of which may be either an occupant or environmental sensor (explained below). Although the space 102 is shown as possessing three sensors 106, the space 102 may in fact possess any number of sensors 106.

Physiological and/or behavioral parameters of the occupant 104 are measured by one or more occupant sensors 106. The occupant sensors 106 detect and/or measure physiological/behavioral parameters of the occupant 102, and communicate the information to a computer 108. An occupant sensor 106 may take on many forms. For example, an occupant sensor 106 may be a thermal sensor (such as an infrared detector or infrared cell) for determining the temperature of the occupant 104. The occupant sensor 106 may also be an electrode, transducer, or other device embedded in a chair, desk, lamp, filing cabinet (or other piece of furniture or fitting that may be in contact with the occupant) for detecting minute changes in voltage, current, pressure (e.g., the electrode is a piezoelectric), or any other time-varying physical quantity that corresponds to blood pressure, pulse rate, respiration rate, or other physiological parameter. The occupant sensor 106 may also detect presence or absence of the occupant 104, as by detecting the presence or lack of warmth emanating from the occupant's 104 body, or by detecting the occupant's 104 presence by virtue of bouncing an electromagnetic wave off of the occupant 104. Accordingly, data concerning how long the occupant 104 remains in a particular location, such as a chair, or how many times the occupant passes a certain location (such as the threshold of a doorway providing access to the space 100) may be collected and communicated to the computer 108. The occupant sensor 106 may also be a flame or smoke detector, so that smoking behavior of an occupant 104 may be monitored.

As mentioned earlier, one or more of the sensors 106 may also be an environmental sensor. Each of the environmental sensors 106 measures at least one physical condition of the space 102, and returns the measurement to the computer 108. An environmental sensor 106 may take on the form of a temperature gauge, a humidity gauge, an airflow gauge, an acoustic gauge, or a light level gauge, to name a few possible embodiments.

Also included in the workplace 100 of FIG. 1, is a plurality of environmental control devices 110. Each environmental control device 110 influences a physical condition of the space 102. Although the workplace 100 is shown as having three environmental control devices 110, it may in fact have any number of such devices 110. An environmental control device 110 may be a heating element, an air conditioning unit, a humidifier, a dehumidifier, a fan, a light, or a speaker for emitting acoustic noise, to name a few examples. Each of the environmental control devices 110 is under control of the computer 108.

The computer 108 may be programmed to unearth relationships between physical conditions of the space 102, and behavioral and/or physiological responses of the occupant 104. These relationships may be learned other ways, as well. For example, the occupant(s) 104 may be surveyed for the purpose of providing their subjective judgment regarding the conditions of the 102 and their response thereto. The results may be stored in a memory device 112 (discussed below) accessible by the computer 108. More detail concerning this aspect of the computer 108 is provided herein, below. The computer 108 may receive, at various points in time, measurements from each of the occupant and environmental sensors 106. The measurements may be timestamped or otherwise identified with the point in time at which they were taken, so that occupant (behavioral or physiological) data can be related to physical condition data. The measurements are then stored in a memory device 112.

Per one embodiment of the invention, the computer 108, environmental control devices 110, and sensors 106 cooperate to form a feedback loop. The computer 108 initially commands the environmental control devices 110 to establish a prescribed set of physical conditions in the space 102. Thereafter, the computer 108 reads data from the sensors 106 to determine the actual physical conditions of the space 102 and to determine physiological or behavioral traits of the occupant 104. The physiological or behavioral data is then compared against a set of ideal or desired values stored in the memory device 112. The ideal or desired values may be stored in a database in the memory device, with each desired value being unique for each occupant 104. Thus, for example, a first occupant may have a desired heart rate of 85 bpm, while a second occupant may have a desired heart rate of 75 bpm. If the measured physiological or behavioral data differs from the desired behavioral or physiological data stored in the memory unit, the computer 108 alters one or more physical conditions of the space 102 to drive the difference between the measured values and the ideal values toward zero.

Figure 2:
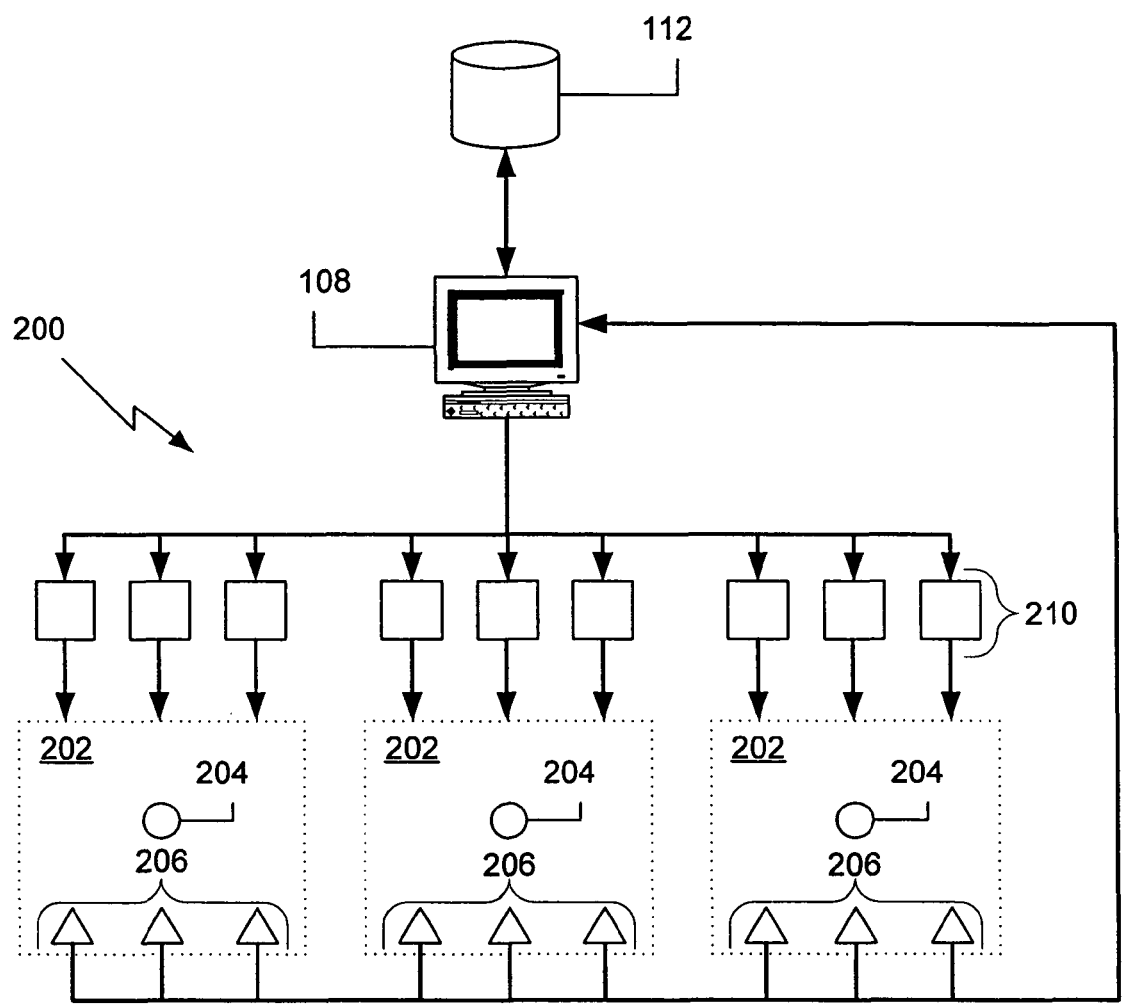
FIG. 2 depicts another architectural setting in which a system in accordance with the present invention has been deployed.

FIG. 2 depicts a workplace 200 with multiple private spaces 202. Similar to the system described with reference to FIG. 1, each private space 202 of FIG. 2 has a plurality of sensors (either environmental or occupant) 206 and environmental control devices 210 in each private space 202. Each private space 202 houses at least one occupant 204. The environmental and occupant sensors 206 and environmental control devices 210 function as described with reference to FIG. 1.

By virtue of the above-described architecture, the computer 108 has access to environmental data and occupant data (both behavioral and physiological) for each private space 202. The computer 108 may exercise individual control over the environment of each private space 202, and may monitor the occupant(s) 204 of each such space 202. Optionally, the computer 108 may average the data gathered from each private space 202 (including both environmental and occupant data), and on the basis of such averaged data may exert aggregate control over the workplace 200, as a whole.

Figure 3:
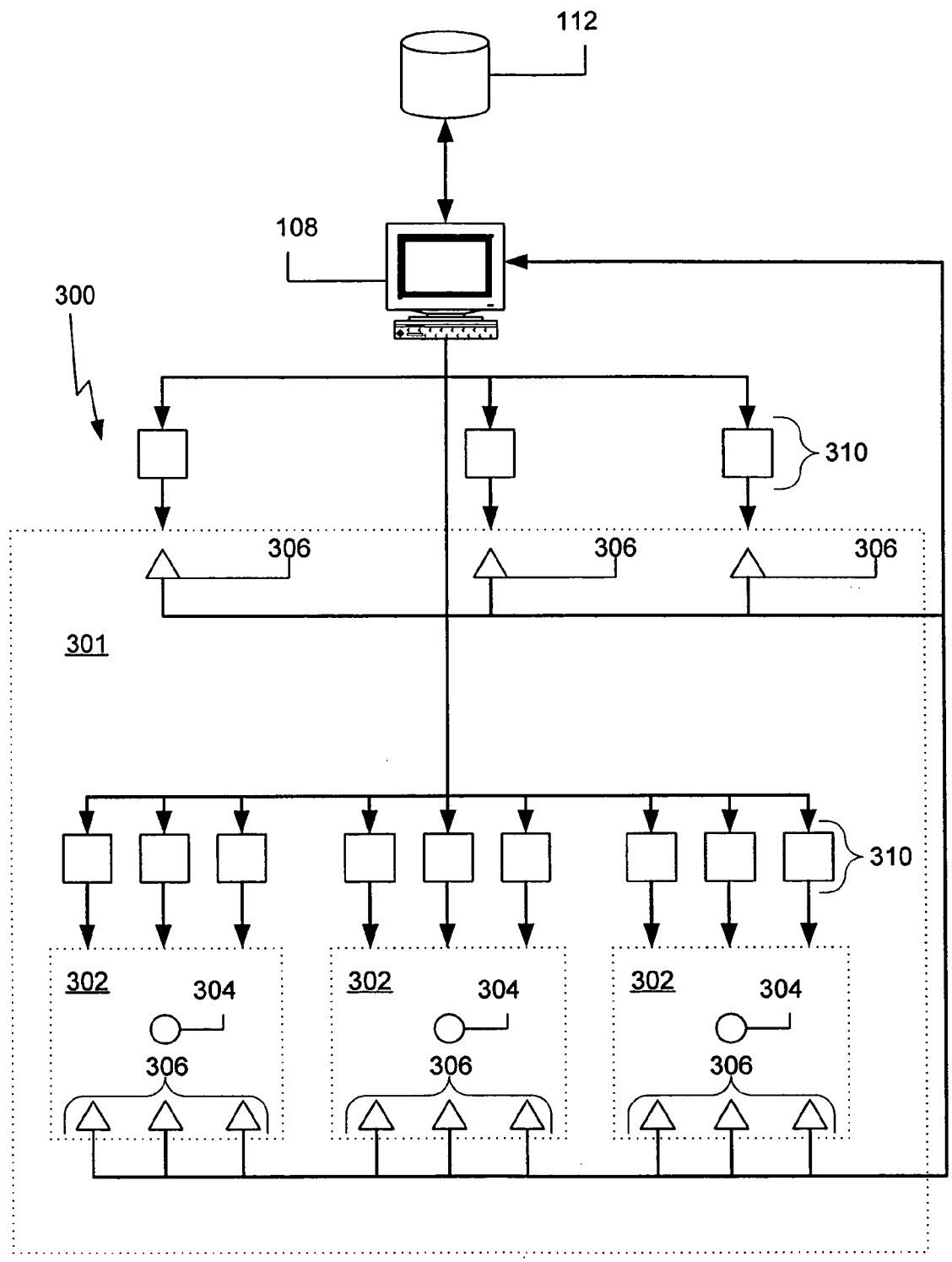
FIG. 3 depicts another architectural setting in which a system in accordance with the present invention has been deployed.

FIG. 3 depicts a workplace 300 with multiple private spaces 302 and a community space 301. The occupants spaces 302 herein typically house a single occupant 304, although may house more (perhaps 2 to 4). An example of a private space is an individual office or a cubicle. The community space 301 typically contains many occupants 304, but may not be a "permanent" space for any occupants. For example, a community space 301 may be a hallway, a cafeteria, or an auditorium.

The private spaces 302 of FIG. 3 are equipped as in FIG. 2. The spaces 302 contain a plurality of sensors (either environmental or occupant) 306 and environmental control devices 310. Again, the environmental and occupant sensors 306 and environmental control devices 310 function as described with reference to FIG. 1. The community space 301 is also outfitted with a plurality of sensors (either environmental or occupant) 306 and environmental control devices 310, which function as described with reference to FIG. 1. Thus, the computer 108 has access to environmental data and occupant data (both behavioral and physiological) for each private space 302 and for the community space 301. Accordingly, The computer 108 may exercise individual control over the environment of each private space 302, and may monitor the occupant(s) 304 of each such space 302. Further, the computer 108 may exercise control over the community space 301, and may monitor behaviors of occupants 304 in the community space. Per one embodiment, the computer exerts control over the community space 301, by forcing each of the physical conditions of the community space to be the average of the individual private spaces 302.

Figure 4:
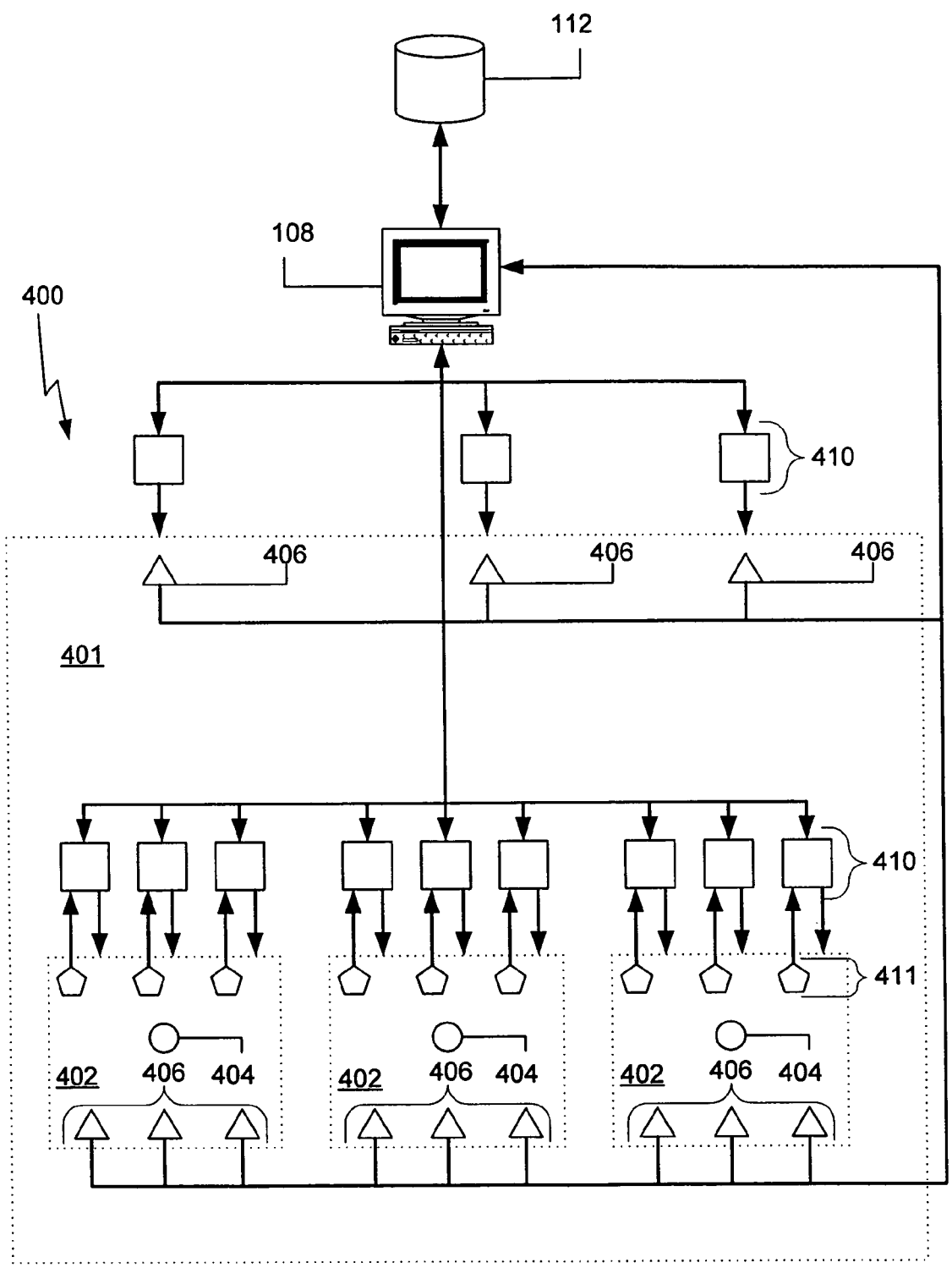
FIG. 4 depicts another architectural setting in which a system in accordance with the present invention has been deployed.

FIG. 4 depicts a workplace 400 with multiple private spaces 402 and a community space 401, as was the case in FIG. 3. Again, the private spaces 402 herein typically house a single occupant 404, although may house more (perhaps 2 to 4). The community space 401 typically contains many occupants 404, but may not be a "permanent" space for any occupants 404.

The private spaces 402 of FIG. 4 are equipped as in FIG. 2, with one additional feature: each private space has one or more control units 411. The control units 411, provide the occupants 404 with control over the environmental control devices 410. For example, in the case where the environmental control device 410 is a heating or cooling unit, the control unit 411 may be a thermostat, which allows the occupant to control the heating or cooling unit. The control units 411 are in communication with the computer 108. Therefore, when the occupant 402 adjusts a physical condition via a control unit 411, the setting information is transmitted to the computer 108 and timestamped, or otherwise associated with time, so that it may be associated with corresponding occupant and environmental data.

Once again, the computer 108 may exercise individual control over the environment of each private space 302, and may monitor the occupant(s) 304 of each such space 302. Further, the computer 108 may exercise control over the community space 301, and may monitor behaviors of occupants 304 in the community space. Per one embodiment, the computer exerts control over the community space 301, by forcing each of the physical conditions of the community space to be the average of the individual private space 302.

Figure 5:
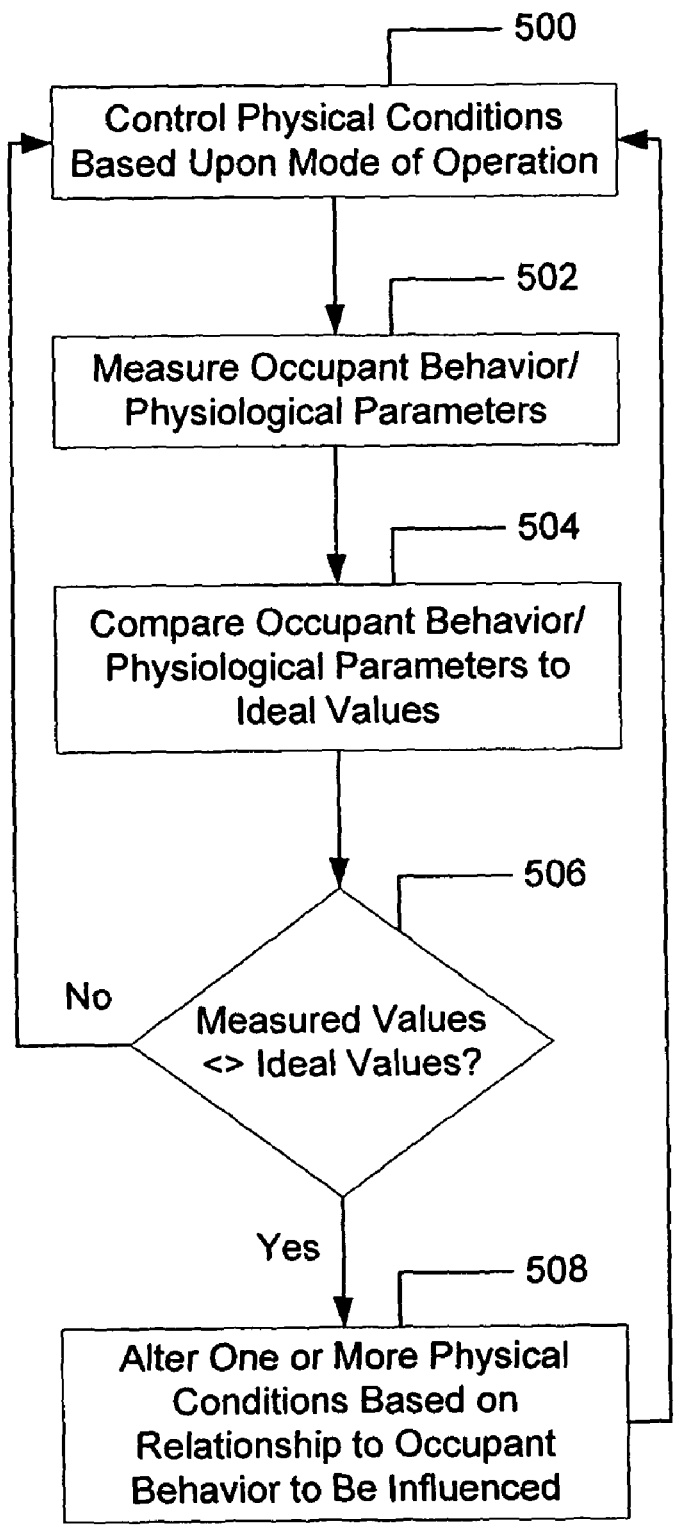
FIG. 5 depicts a flow of operation for controlling the physical conditions of a space, so as to maximize desire occupant activity.

FIG. 5 depicts a flow of operation for controlling the physical conditions of a space (either a private space or a community space), so as to maximize a desired occupant response. The scheme depicted in FIG. 5 may be used for determining control over a private space or a community space, and may be used in conjunction with any of the workplaces and systems depicted in FIGS. 1-4. Preferably, the flow of operation depicted in FIG. 5 is executed by the computer 108 of FIGS. 1-4. As can be seen from FIG. 5, the physical conditions of a space are initially controlled in accord with a mode of operation, as shown in operation 500. A mode of operation refers to a general scheme used to control the physical conditions of a space. For example, the physical conditions of a space may be generally held constant, or may generally be made to mimic the variations that the conditions undergo throughout a day. Modes of operation are discussed more thoroughly, below. Assume, for the sake of illustration, that the mode of operation called for all of the physical conditions to be held at a constant level that was chosen so as to be normatively comfortable. As a consequence of being in this mode of operation, the physical conditions would be controlled so as to arrive at their normative values in operation 500. The physical conditions are controlled via the environmental control devices described with reference to FIGS. 1-4.

Next, in operation 502, occupant reaction is measured. As described earlier, occupant reaction may be either physiological (e.g. pulse rate) or behavioral (e.g., length of time for which the occupant remains in his chair). The occupant data used in operation 502 is obtained from the sensors described with reference to FIGS. 1-4.

Next, in operation 504, the measured behavioral/physiological reaction of the occupant is compared with ideal values for the occupant. The ideal values may be stored in a database contained in the memory unit 112. The ideal values may be associated with an identification code unique to each occupant. Accordingly, this comparison may be performed on an occupant-by-occupant basis. If the measured behavioral/physiological reaction of the occupant differs from the ideal value, one or more physical conditions of the space are altered, so as to bring the behavioral/physiological parameters toward their ideal values, as shown in operation 508.

In order to determine which physical condition to adjust in order to bring the discrepant behavioral/physiological parameter toward its ideal value, a database may be accessed. The database may be organized by mode of operation. For each mode of operation, the database may contain a list of physical conditions, with each physical condition having associated with it a correlation for each behavioral/physiological parameter. Thus, the database may be queried, for example, for the physical condition having the highest correlation with the discrepant behavioral/physiological parameter for a given mode of operation. Then, the physical condition returned by the database may be adjusted, based upon the correlation, so as to bring the discrepant behavioral/physiological parameter toward its ideal value. Accordingly, the adjusted physical condition will thereafter be controlled to be at a value determined by the occupant's behavior, rather than by the mode of operation. Alternatively, the database may be queried for two or more physical conditions having the highest correlation with the discrepant behavioral/physiological parameter for a given mode of operation. The two or more physical conditions returned by the database may be adjusted, based upon their respective correlations, so as to bring the discrepant behavioral/physiological parameter toward its ideal value.

Figure 6:
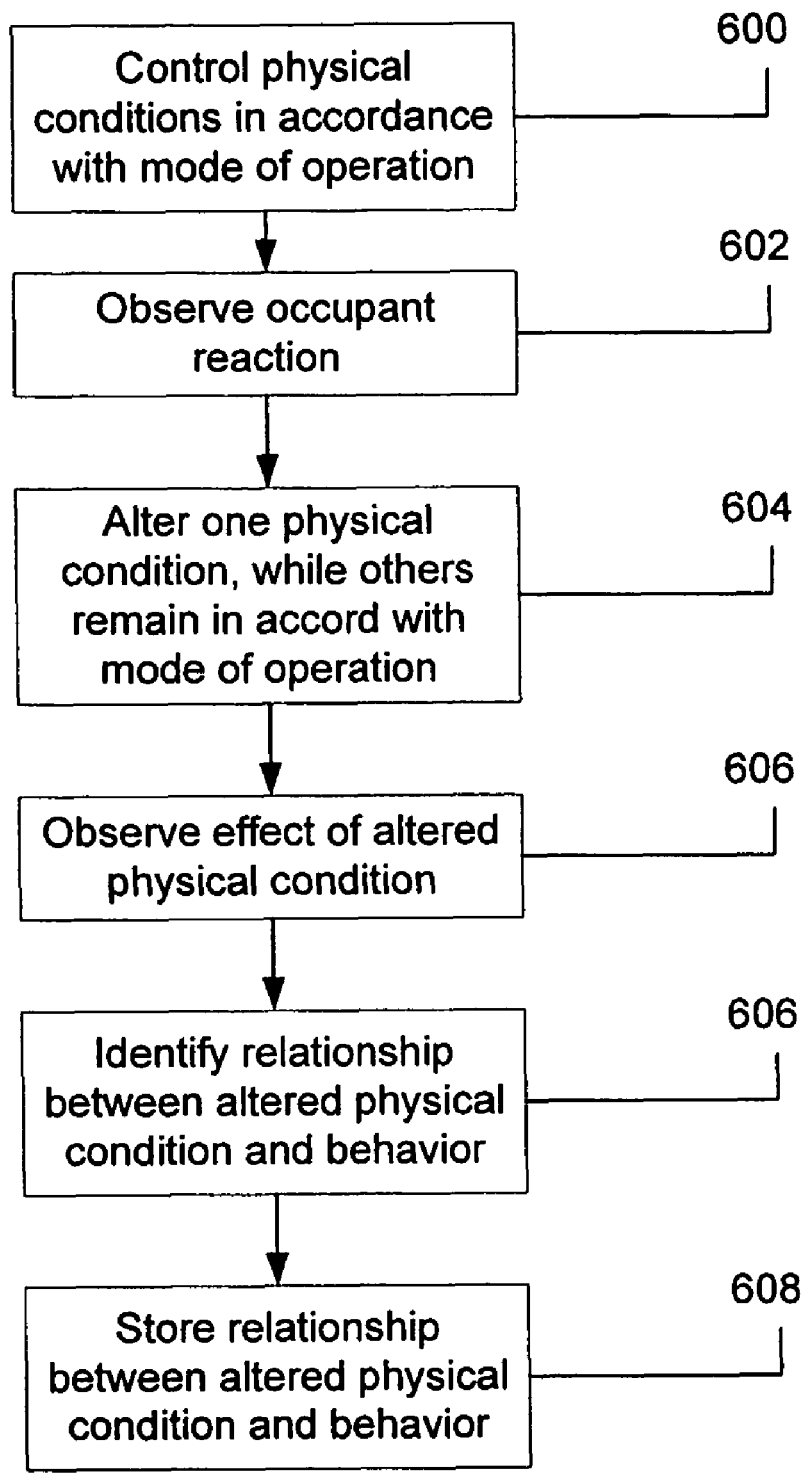
FIG. 6 depicts a sequence of operations for determining the relationship between a physical condition and an occupant reaction.

FIG. 6 depicts a sequence of operations for determining the relationship between a physical condition and an occupant reaction. The scheme of FIG. 6 may be used to populate a database with correlations for use with the scheme of FIG. 5. Initially, as shown in operation 600, the physical conditions of a space are controlled by the computer 108, so as to be in accordance with a mode of operation. As discussed earlier, a mode of operation is a general scheme used to control the physical conditions of a space. Thought of in another way, a mode of operation determines how the physical conditions of a space will be controlled in the absence of any difference between measured and ideal occupant data. For example, in one mode of operation the system observes occupant preferences throughout the day. An occupant, may turn the temperature in his office up in the morning, and turn the heat down in the afternoon, for instance. The system observes these tendencies, and automatically controls the system to track the occupant's preferences. Thus, assuming the occupant's physiological and behavioral data remains ideal, the system will continue to control the physical condition in accordance with the occupant's preferences. The system may employ any number of modes of operation.

While the physical conditions are being controlled (via the environmental control devices) in accordance with the mode of operation, the system monitors (via the occupant sensors) the behavioral/physiological status of the occupant of a space, as shown in operation 602. Preferably, the measurements are read from the sensors at intervals. With each reading, the measurements are entered into an ordered list, or timestamped, or otherwise associated with the time at which the measurements were taken. In this way, it is possible to associate occupant data with environmental data, in order to detect any trends that may exist therein.

After a period of controlling the physical conditions according to the mode of operation, a particular physical condition is selected for testing. The selected physical condition is then altered from the value it would otherwise have by virtue of the mode of operation (e.g., it is either abnormally elevated or reduced). Meanwhile, the remaining physical conditions remain controlled in accordance with the mode of operation, as shown in operation 604. In the wake of having altered the value of the selected physical condition, occupant reaction (physiological or behavioral) is observed (operation 606) in the same manner as described above, with reference to operation 602.

Based upon the time-based collections of occupant and environmental data, a correlation is computed between the selected physical condition and each measured behavior, as shown in operation 608. Each correlation is stored in a database (operation 610) in association with the occupant parameter and physical condition to which it refers, and the mode of operation in which the correlation was calculated. Later, this information can be used to support the query described with reference to FIG. 5.

The above-described scheme is repeated for every physical condition and every mode of operation, in order to fully populate the database. Further, the scheme of FIG. 6 may be executed in its entirety periodically, so that new correlations can be generated from time to time.

Figure 7:
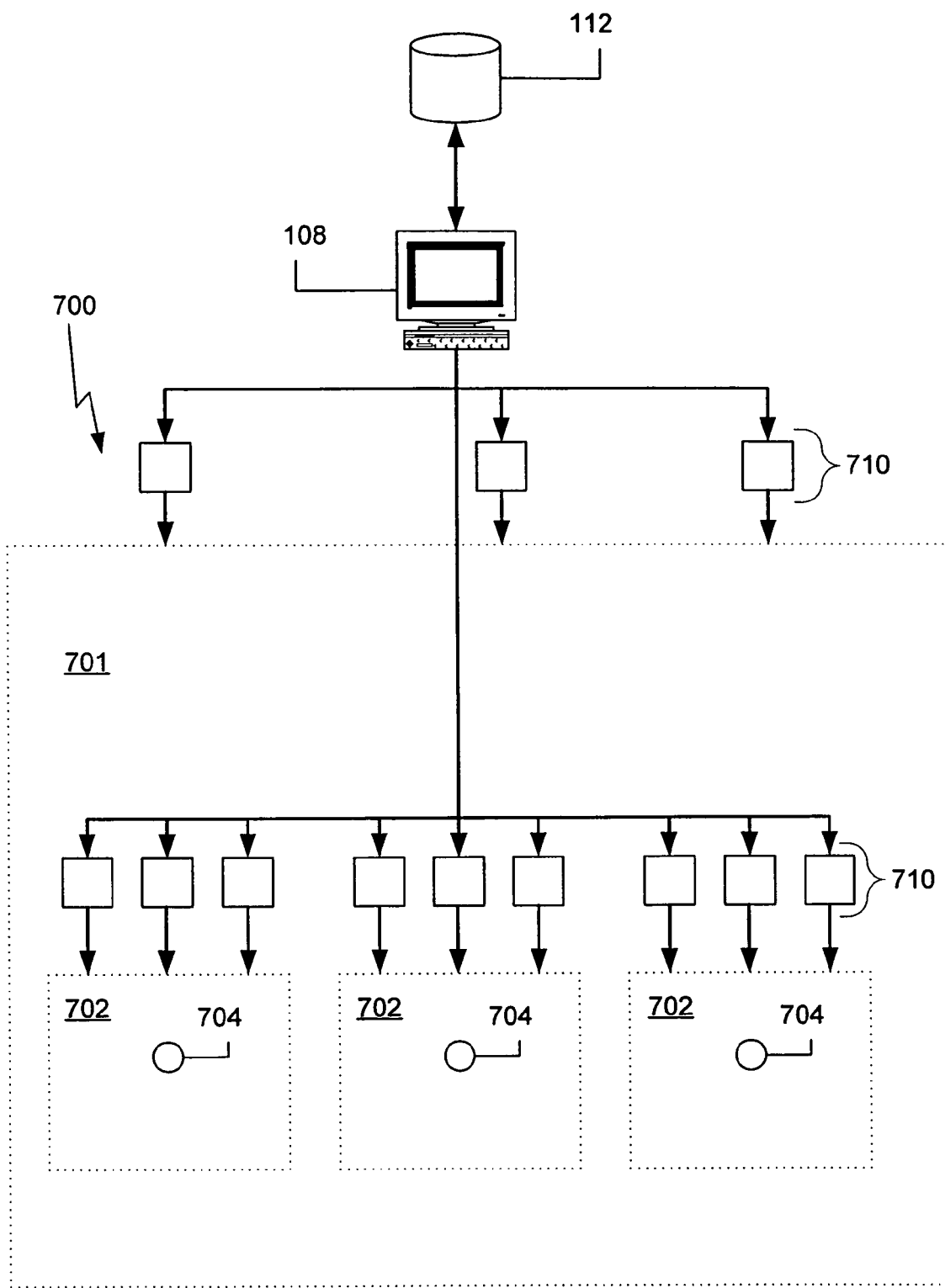
FIG. 7 depicts another architectural setting in which a system in accordance with the present invention has been deployed.

Other embodiments of the invention exist. For example, FIG. 7 depicts a workplace or other architectural setting 700 with multiple private spaces 702 and a community space 701. Each private space 702 may house one or more occupants 704. As in previous embodiments, the private spaces 702 contain a plurality of environmental control devices 710. The community space 701 is also outfitted with a plurality of environmental control devices 710.

Notably, the embodiment depicted in FIG. 7 lacks occupant sensors. In such an embodiment, the computer 108 accesses the memory device 112 (such as a database) to gain information regarding how the architectural setting 700 is to be controlled. The memory device 112 may contain data regarding how to control the environment of the community space 701 and each private space 702 individually. Further, the memory device 112 may contain data regarding how to control the environment of the private spaces 702 and or community space 701 in aggregate. The data may be derived from occupant surveys.

The aforementioned surveys may require each occupant 704 to record their subjective preferences with respect to various aspects of the physical environment. For example, one or more environmental variables may be manipulated over a period of time (temperature may be set to 74° F. for a day). Thereafter, the occupants may be given a survey regarding their reaction. For example, the survey may ask the occupants if they felt tired, relaxed, energetic, too hot, too cold, etc. On a subsequent day, the temperature may be set to 76° F. for a day, and the same questions may be asked. In this way, data regarding the correlation between temperature (or any other environmental variable) and any subjective reaction may be gathered. The data may be stored in the memory device 112, and the computer 108 may control the environment of the architectural setting in accordance with the data therein. Alternatively, the environment may be controlled in accordance with a first theme for a given duration of time. The occupants may be surveyed regarding their response to the theme. (For example, throughout a first day, the environmental variables of the architectural setting may be manipulated according to a theme wherein the environmental variables mimic the patterns of daytime. Occupants are surveyed at the end of the first day. Throughout a second day, the environmental variables of the architectural setting manipulated according to a theme wherein the environmental variables oscillate about a nominally comfortable setting. Occupants are surveyed at the end of the second day.) In this way, data regarding the correlation between theme and subjective reaction may be gathered. Again, this data is stored in the memory device 112, and the computer 108 selects a theme to maximize whatever set of subjective reactions are desired. The theme may be used throughout the architectural setting 700 as a whole, or may be implemented on a space-by-space 702 basis.

Occupant surveys may be conducted via computer. For example, each occupant may access a computer (e.g., may use a computer located in his or her private space) for the purpose of accessing a web server (via a web browser running on the computer), which hosts the survey. The occupant-accessible computer may be housed within the architectural setting that is to be controlled. The survey may be conducted at any interval (daily, weekly, monthly, etc.). The website collects the data and stores it in a database. The contents of the database may or may not be transmitted to another computing facility for analysis.

If conducted at intervals, the occupant surveys serve to complete a feedback loop (i.e., the environment is manipulated by the computer 108 and the environmental control devices 710; the effects of such manipulation are recorded by the surveys, and the computer 108 may control the environment based upon the data generated by the occupant surveys.)

Optionally, the architectural setting 700 may be provided with one or more environmental measurement apparatuses. For example, the architectural setting 700 may be provided with a multidisciplinary analyzer which is an agglomeration of measuring devices that assess such environmental variables as light level, temperature, air quality, etc. For example, a multidisciplinary analyzer may include: (1) a globe thermometer for deriving operative temperature, predicted mean vote index, predicted percentage of dissatisfied index, sudoration request index, and the wet bulb globothermometric temperature index; (2) a thermohygrometer probe for measuring temperature, relative humidity, and dew point; (3) a hot-wire anemometer for measuring air speed; (4) a phonometer for measuring noise levels in enclosed environments; (5) a lux meter for measuring illumination values in indoor environments; (6) a gas probe for measuring $CO_2$ concentration; (7) a gas probe for measuring CO concentration; (8) a net radiometer for measuring radiation asymmetry; (9) a psychrometer, a forced ventilation probe used to measure dry-bulb and wet-bulb temperatures, for calculating dew-point temperature, enthalpy of air, and absolute humidity, among other variables; (10) a naturally ventilated, wet-bulb temperature probe for deriving the wet bulb globothermometric temperature index defined by ISO 7243; and (11) an analyzer, which interfaces to any of the aforementioned units to record a series of measurements therefrom. The measurements may be communicated to the same computing facility that receives the occupant survey data. For example, the measured data may be uploaded to a computer that transmits the data across a network to another computing facility. In this way, occupant response to environmental variables can be measured. In fact, this embodiment permits occupant response to environmental variables to be measured, even if the environment, itself, is not being manipulated.

Occupant surveys may be used in conjunction with any of the aforementioned architectural/office settings, including those having occupant sensors. Occupant surveys may seem to provide similar information to that yielded from occupant sensors. However, they are different in an important respect. Occupant sensors record measurable, observable data, which is assumed to correspond with a mental state or behavioral propensity (drowsiness, alertness, contentedness, etc.). A system that records observable data, alone, can maximize exhibition of the observable data by one or more occupants. By doing so, it is assumed that the desired mental state or behavior of each occupant is achieved. On the other hand, by recording occupant survey data, a direct measurement of the mental state, itself, is achieved. For example, it can be known that a particular occupant felt energetic, by directly asking the occupant to rank his energy level on a scale of one-to-seven. By measuring heart rate, breathing rate, etc., it can only be assumed that the occupant felt energetic.

The aforementioned multidisciplinary analyzer may be used yet another way. An architectural setting may be provided with a multidisciplinary analyzer (e.g., an environmental analysis company may provide an accounting office with a multidisciplinary analyzer). The occupants of the architectural setting may be instructed to locate the multidisciplinary analyzer in various locations, so that at least one set measurements can be taken (e.g., the environmental analysis company obtains a floor plan of the accounting company. The environmental analysis company instructs the accounting company to locate the multidisciplinary analyzer at a first location in their facility. Measurements are taken and associated with a code that identifies the location at which the measurements were taken. Thereafter, the environmental analysis company instructs the accounting company to locate the multidisciplinary analyzer at another location in their facility. Measurements are again taken and associated with a code that identifies the new location at which the measurements were taken.). The set of measurements may then be communicated to a remote computer (such as a computing facility run by the aforementioned environmental analysis company) where they may be stored in a database and analyzed. The analysis may include comparing the data from the multidisciplinary analyzer with survey data to gain an understanding of how the environment affects the subjective opinions of the occupants. The database may be organized so that measurements made by the multidisciplinary analyzer can be associated with survey answers provided by occupants (e.g., the database associates the measurements taken in a particular employee's office and the survey answers of that employee). Finally, survey and measurement data from many different architectural settings may be stored in a database, so that a library of accumulated knowledge may be built.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the scheme may be altered to determine the relationship between a behavioral/physiological parameter of an occupant and a set of physical conditions being altered in tandem. Additionally, the scheme may use measurements other than correlations to describe the relationship between a behavioral/physiological parameter and a physical condition. The scheme is susceptible to deployment in any setting in which occupants are present and the environment may be controlled. Furthermore, the computing environment in which the scheme herein is described as operating within may be altered to contain network equipment and computing devices not described herein, and which are well known in the art. Numerous other changes may be made which will readily suggest themselves to those skilled in the art and which are encompassed in the invention disclosed and as defined in the appended claims.

The claimed invention is:

1. A method for increasing occupant productivity within an architectural setting, the method comprising
   initially controlling a plurality of physical conditions within the architectural setting, so as to hold the physical conditions substantially constant, wherein the physical conditions include temperature, humidity, airflow, and light level;
   altering one of the physical conditions of temperature, humidity, and airflow;
   observing a change in behavior of an occupant of the architectural setting in view of the altering at least one of the physical conditions of temperature, humidity, and airflow;
   determining a first relationship between the change of behavior and the altered physical condition;
   storing the first relationship in a database;
   altering the light level;
   observing a change in behavior of an occupant of the architectural setting in view of the altering the light level;
   determining a second relationship between the change of behavior and the altered light level; and
   storing the second relationship in a database.

2. The method of claim 1, wherein the step of determining the relationship between the change of behavior and the altered physical condition comprises calculating a correlation between a variable representing the behavior and a variable representing the altered physical condition.

3. The method according to claim 1, further comprising:
   sensing a behavior of an occupant of the architectural setting;
   comparing the behavior with a desired behavior;
   if the sensed behavior differs from the desired behavior by more than a predetermined tolerance, searching the database for the physical condition with the strongest relationship to the behavior; and
   altering the physical condition with the strongest relationship to the behavior, so as to bring the sensed behavior closer to the desired behavior.

4. The method according to claim 2, further comprising:
   sensing a behavior of an occupant of the architectural setting;
   comparing the behavior with a desired behavior;
   if the sensed behavior differs from the desired behavior by more than a predetermined tolerance, searching the database for the physical condition with the greatest correlation to the behavior; and
   altering the physical condition with the greatest correlation to the behavior, so as to bring the sensed behavior closer to the desired behavior.

5. The method of claim 1, further comprising:
observing preferences of an occupant of the architectural setting with respect to how that occupant controls the plurality of physical conditions over time; and
automatically controlling the physical conditions of the architectural setting to in accord with the observed preferences of the occupant.

6. The method of claim 1, further comprising:
observing one or more physical conditions outside the architectural setting; and
automatically controlling one or more physical conditions to mimic the observed conditions outside the architectural setting.

7. A method for increasing occupant productivity within an architectural setting, the method comprising:
initially controlling a plurality of physical conditions within the architectural setting, so as to cause the physical conditions to vary in accordance with a theme, wherein the physical conditions include temperature, humidity, airflow, and light level, and wherein the theme comprises one of:
(a) mimicking the daily patterns of daylight, wherein light sources in the architectural setting are brighter on an east side of the architectural setting at a beginning of a day and progressively become brighter on a west side of the architectural setting as the day wears on;
(b) mimicking the daily patterns of temperature, wherein the architectural setting is provided to be cool in the morning, warmer in the afternoon, and cool again towards evening;
(c) controlling thermal values of the architectural setting to oscillate around a nominally comfortable value; or
(d) mimicking a pattern of current outdoor conditions;
altering one of the physical conditions of temperature, humidity, and airflow, so as to cause the altered physical condition to deviate from the theme;
observing a change in behavior of an occupant of the architectural setting in view of the altering one of the physical conditions of temperature, humidity, and airflow;
determining a first relationship between the change of behavior and the altered physical condition;
storing the first relationship in a database;
altering the light level;
observing a change in behavior of an occupant of the architectural setting in view of the altering the light level;
determining a second relationship between the change of behavior and the altered light level; and
storing the second relationship in a database.

8. The method of claim 7, wherein the step of determining the relationship between the change of behavior and the altered physical condition comprises calculating a correlation between a variable representing the behavior and a variable representing the altered physical condition.

9. The method according to claim 7, further comprising:
sensing a behavior of an occupant of the architectural setting;
comparing the behavior with a desired behavior;
if the sensed behavior differs from the desired behavior by more than a predetermined tolerance, searching the database for the physical condition with the strongest relationship to the behavior; and
altering the physical condition with the strongest relationship to the behavior, so as to bring the sensed behavior closer to the desired behavior.

10. The method according to claim 8, further comprising:
sensing a behavior of an occupant of the architectural setting;
comparing the behavior with a desired behavior;
if the sensed behavior differs from the desired behavior by more than a predetermined tolerance, searching the database for the physical condition with the greatest correlation to the behavior; and
altering the physical condition with the greatest correlation to the behavior, so as to bring the sensed behavior closer to the desired behavior.

11. The method of claim 7, further comprising:
observing preferences of an occupant of the architectural setting with respect to how that occupant controls the plurality of physical conditions over time; and
automatically controlling the physical conditions of the architectural setting to in accord with the observed preferences of the occupant.

12. The method of claim 7, further comprising:
observing one or more physical conditions outside the architectural setting; and
automatically controlling one or more physical conditions to mimic the pattern of observed conditions outside the architectural setting.

* * * * *